US008719311B2

(12) United States Patent
Blight et al.

(10) Patent No.: US 8,719,311 B2
(45) Date of Patent: May 6, 2014

(54) PROVIDING HOMOGENEOUS VIEWS OF INFORMATION COLLECTIONS IN HETEROGENEOUS INFORMATION STORAGE SOURCES

(75) Inventors: Jeffrey Blight, Windsor (GB); Amanda Elizabeth Chessell, Alton (GB); Dan Jeffrey Mandelstein, Austin, TX (US); Ivan Matthew Milman, Austin, TX (US); Charles Daniel Wolfson, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 4 days.

(21) Appl. No.: 13/051,139

(22) Filed: Mar. 18, 2011

(65) Prior Publication Data

US 2012/0239703 A1    Sep. 20, 2012

(51) Int. Cl.
*G06F 17/30* (2006.01)
(52) U.S. Cl.
USPC ......................................................... 707/802
(58) Field of Classification Search
USPC ......................................................... 707/802
See application file for complete search history.

(56) References Cited

U.S. PATENT DOCUMENTS

| 5,339,434 | A  | * | 8/1994 | Rusis ........................ 709/246 |
| 7,085,773 | B2 | * | 8/2006 | Dorsett, Jr. ................ 707/755 |
| 7,200,563 | B1 |   | 4/2007 | Hammitt et al. |
| 7,328,233 | B2 | * | 2/2008 | Salim et al. ................ 709/202 |
| 7,363,578 | B2 |   | 4/2008 | Bendsen et al. |
| 7,512,628 | B2 | * | 3/2009 | Chess et al. ................ 705/7.11 |
| 2002/0035593 | A1 |   | 3/2002 | Salim et al. |
| 2003/0212654 | A1 | * | 11/2003 | Harper et al. ................ 707/1 |
| 2009/0327347 | A1 |   | 12/2009 | Hoang et al. |

* cited by examiner

*Primary Examiner* — Sheree Brown
(74) *Attorney, Agent, or Firm* — Mollborn Patents, Inc.; Fredrik Mollborn

(57) ABSTRACT

A method, apparatus and computer program product, for generating a framework for supporting a homogeneous view of an information collection managed in a heterogeneous system of information storage sources. The framework includes an information collection data model mapped to an information source data model, and an information storage services data model mapped to the information source data model. The information collection data model defines information to be collected and stored as an information collection in one or more information storage sources. The information source data model references data sets containing the information defined in the information collection data model. The information storage services data model defines information storage services for accessing and performing operations on the one or more information storage sources storing the information collection. The framework allows a user to view and perform operations on the information collection without knowing how the information collection is stored.

20 Claims, 4 Drawing Sheets

PROVIDING HOMOGENEOUS VIEWS OF INFORMATION COLLECTIONS IN HETEROGENEOUS INFORMATION STORAGE SOURCES

BACKGROUND

The present invention relates to information management. Information held by an organization can be used for many purposes, for example, to gain an understanding of how the organization is performing, to assess what risks exists and where to discover opportunities for new business or continued growth, etc. In order to do this, the organization typically treats information as an asset, that is, the information needs to be managed, measured, protected and maintained to appropriate standards.

This emerging field, dedicated to managing information as an asset, is referred to using several names, such as "data governance", "business information management and protection," or "information governance." Within this field is a new user role, referred to as the "Data Steward." The definition of the Data Steward role is still in some flux, and it is believed that there may be several levels of data steward in an organization, ranging from a "Technical Data Steward," who is responsible for the ensuring that the underlying software and hardware supports data governance requirements, to a "Line-of-Business Data Steward," who is responsible for data governance for the line of business, and an "Executive level Data Steward" role. Nevertheless, irrespective of the level at which the Data Steward is operating, the Data Steward is responsible for a collection of information. The responsibilities include, for example, ensuring that the information collection meets the needs of the organization in terms of quality, availability, accuracy, precision and timeliness, etc.

What constitutes an information collection is typically defined by the business-side of the organization. For example, "Records for customers living in North America" or "Records for high-value customers" or "Physical Assets older than five years" are examples of various types of information collections. Typically these information collections are supported by a heterogeneous set of systems, in which each system may support parts of multiple collections. Furthermore, within each system, there can also be a variety of technology products involved in managing the information, such as ETL (Extract Transform and Load) tools, data quality tools, data management tools, application screens, development tools, etc. Currently, the Data Steward may need to use several of these tools to keep their information collection up to the required standards. While each individual tool may adequately serve its specific purpose, there is currently no single tool that a Data Steward can use to record the needs of the information collection as a whole and manage the information collection as such. Having a single, overarching tool would allow Data Stewards to maintain a business focus to represent the organization's information needs, rather than being distracted by the limitations of using a patchwork of individual, specialized information management and processing tools.

SUMMARY

Embodiments of the invention provide a method, apparatus and computer program product for generating a framework for supporting a homogeneous view of an information collection managed in a heterogeneous system of information storage sources. An information collection data model is provided that defines information to be collected and stored as an information collection in one or more information storage sources. An information source data model is provided that references data sets containing the information defined in the information collection data model. An information storage services data model is provided that defines information storage services for accessing and performing operations on the one or more information storage sources storing the information collection. A first mapping is generated between the information collection data model and the information source data model. A second mapping is generated between the information source data model and the information storage services data model. The information collection data model, the information source data model, the information storage services data model, and the first and second mappings are configured to allow a user of the framework to view and perform operations on the information collection without having any knowledge about how the information collection is stored in the information storage sources The details of one or more embodiments of the invention are set forth in the accompanying drawings and the description below. Other features and advantages of the invention will be apparent from the description and drawings, and from the claims.

BRIEF DESCRIPTION OF THE SEVERAL VIEWS OF THE DRAWINGS

Like reference symbols in the various drawings indicate like elements.

DETAILED DESCRIPTION

Figure 1:
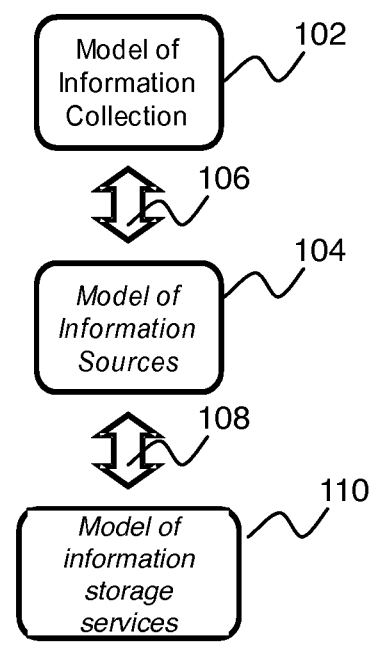
FIG. 1 shows a conceptual overview of the data models (100) of a Data Stewardship Framework in accordance with one embodiment.

Various embodiments of the invention pertain to a method, apparatus and computer program product that provide a framework which defines a mapping between an organization's definition of the information collection and tools that support the information collection. The framework in accordance with the various embodiments that will be described below is highly customizable and multi-user, so the framework can be set up to support several Data Stewards within the organization in a consistent, coherent manner, irrespective of the technology that is used to hold the information. Through this framework it is possible to enforce policies and apply changes consistently across an information collection, to drive approval cycles as changes are made to the data, and to insert missing values as if the information in the collection is co-located. The framework can be used to manage essentially any type of data, such as metadata, reference data, classification data, operational and analytical (Data Warehouse) data. The framework can also be used to provide support for temporary collections of data, for example, an extract of data in a staging table for an application migration or consolidation project. As will be clear from reading the following specification, these are merely some examples of use areas of the framework, and many other uses and variations that fall within the scope of the appended claims can be envisioned by those skilled in the art.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

FIG. 1 shows a conceptual overview of the core idea of a Data Stewardship Framework in accordance with one embodiment. The details of the Data Stewardship Framework (herein after referred to as "the framework") will be discussed in further detail below with reference to FIGS. 2 and 3. The core idea is to have a framework that recognizes two levels of a data model; a first model of information collection (102) and a second model of information sources (104) covering relevant data at rest and data in motion. A mapping (106) exists between the information collection (102) and the information sources (104). The information sources (104) are mapped (108) to a conventional information storage services data model (110) for moving data, profiling data, maintaining data, and generating reports about the data, etc.

One example of an information collection model (102) is a structure for a canonical customer record, including features such as the customer's name, address, cell phone number, email address, loyalty status and details pertaining to what products the customer has purchased. The customer record may further contain reference data, that is, fixed lists of data used to categorize certain fields. Some of these fields, for example, gender and courtesy title, have a fixed set of valid values. For example, ISO Standard 5218 defines the following different values for gender: 0 for "Not Known," 1 for "Male," 2 for "Female," and 3 for "Not specified." The information collection defines a canonical set of values for such fields.

The data of the information collection may be divided across, say, three systems. For example, there may be an authoritative source for the core customer data, and two systems that each supports a subset of product purchases. As such, an information source model (104) is needed for each of the three systems, as well as a mapping function (106) of how the three systems map to the information collection (102). At the information sources level (104), there are reference data sets for Gender and Courtesy Title for each source system and how they map to the canonical form.

The information storage services data model (110) defines services for accessing different capabilities representing the Information Sources. The information storage services data model (110) also contains the services for maintaining the reference data sets and distributing the data sets to appropriate places Each of these three levels (102, 104, 110) are represented by several components in the framework, which will now be described with reference to FIG. 2. In the embodiment of the framework (200) shown in FIG. 2, blocks 202-208 represent components of the information collection (102), blocks 210-214 represent components of the information sources (104), and block 216 represents the information storage services data model (110). In addition, blocks 218-236 represent plug-in-points for inserting customized logic, and blocks 238-252 represent standard components of the framework (200). The framework (200) thus preserves the three levels (102, 104, 110) of the information model (100) and allows customized components to be plugged in at any level. All of these components will now be described in further detail.

Information Collection Maintenance User Interface (202)—This is a generated user interface (UI) for maintaining the information collection. The UI displays the fields defined in the information collection model (102), so the user is working with the canonical view of the data, rather than with the format in which the data is actually stored.

Plug-in for User Interface Component (218)—This is a place where one or more customized UI components can be provided by a third party. For example, a chart widget can be provided that shows how many customer records are in error and the errors types that are present.

User Interface Events (238)—This is a set of events emitted and/or received by the collaboration UI components (240) or generated information collection UI components (202). These events allow different components in the UI to pass information about the records the components are displaying. For example, one UI component may display a list of customer records. When the user clicks on a customer record in the list, an event containing the ID of the record is sent to the other UI components so that they can, for example, show the details of the selected record, or related information, which can be, for example, the customer's activity or hometown.

Collaboration User Interface (240)—This is a UI containing components for collaboration, rule management and administration. This UI enables the data steward to see, for example, the list of work that is assigned to her and allows her to change the policies around how the data is managed, for example, who is allowed to see particular data fields.

Information Collection Management, Maintenance and Reporting Services (204)—These are services that support the Information Collection Maintenance User Interface (202). The interface and implementation of these services is also generated. The interface is derived from the information collection data model.

OOTB (Out Of The Box) Services (242)—These are pre-existing services (i.e., separate from the Information Collection Services (204)) that support an OOTB UI. Some examples of such services include, for example, security services, administrative services, printing services, and so on.

Information Collection Active Data Domain (206)—These are data objects representing the active values in the Information collection. For example, for an insurance company, the data objects in the Information Collection Active Data Domain (206) may represent customers who have an active insurance policy.

Information Collection Historical Data Domain (208)—These are data objects representing the historical values in the Information collection. Again, using the example of an insurance company, the data objects in the Information Collection Historical Data domain (208) may represent customers who no longer have active insurance policies.

Information Collection Active Plug-in (220)—This is a place in the framework (200) where one or more customized active data domains can be added. For example, a plug-in could be added to support a new type of business object, such as insurance policies.

Information Collection Historical Plug-in (222)—This is a place in the framework (200) where one or more customized historical data domains can be added, such as expired insurance policies.

Lifecycle, Tasks, Events and Rules (244)—These are components for managing object lifecycles, user tasks, events and rules for the information collection. These components can include, for example, a workflow engine, a rules engine such as the iLog rules engine, which is available from International Business Machines Corporation of Armonk, N.Y.

Information Sources Services (210)—These are standard services for supporting the maintenance of an information source.

Information Movement Data Domain (212)—These are standard services for supporting the movement of information, such as extract, transform and load.

Information Source Data Domain (214)—These are data objects representing an information source, such as a customer in a master data management server.

Information Movement Plug-in (224)—This is a place for adding customized implementations of services for information movement, in general activities like extract, transform and load.

Information Source Plug-in (226)—This is a place for adding customized implementations of services for an information source, such as mapping to a master data management system or a customer relationship manager application.

Implementation Mapping Services (216)—These are standard services, such as create, read, update and delete that need to be implemented by specific implementation components on, for example, the InfoSphere Master Data Management Server, which is available from International Business Machines Corporation of Armonk, N.Y.

Plug-in for Data Movement Capability (228)—This is a place for adding customized implementations of data movement capability, such as the DataStage component of the IBM Information Server, which is available from International Business Machines Corporation of Armonk, N.Y.

Plug-in for Data Profile Capability (230)—This is a place for adding customized implementations of data profiling capability, such as the WebSphere Information Analyzer component of the IBM Information Server, which is available from International Business Machines Corporation of Armonk, N.Y.

Plug-in for Information Source (232)—This is a place for adding customized implementations for maintaining a remote information source.

Plug-in for Reporting Source (234)—This is a place for adding customized implementations of a reporting capability for an information source, such as the Cognos business intelligence and performance software, also available from International Business Machines Corporation of Armonk, N.Y.

Task Manager Services (246)—This is a service for supporting a task list for each data steward.

Notification Services (248)—This is a service for managing external notifications relating to the information collection, such as email or RSS (Really Simple Syndication) messages.

Administration Services (250)—These are services for administering the framework, such as defining details of the data stewards and their access rights.

Metadata Services (252)—These are services for supplying supplementary information about the information collections, for example, active policies, business glossary terms, etc.

Plug-in System Services (236)—This is a place for plugging in external services to replace or augment supplied system services.

The ability to model and generate the three levels of models (102, 104, 110), is implemented on the Master Information Hub (MIH), an InfoSphere product available from International Business Machines Corporation. MIH is a data server, which enables the design of complex data domains (such as the ones described herein), and then creates a set of runtime services to act on those data domains. The Framework (200) provides patterns to guide the development process.

Figure 3:
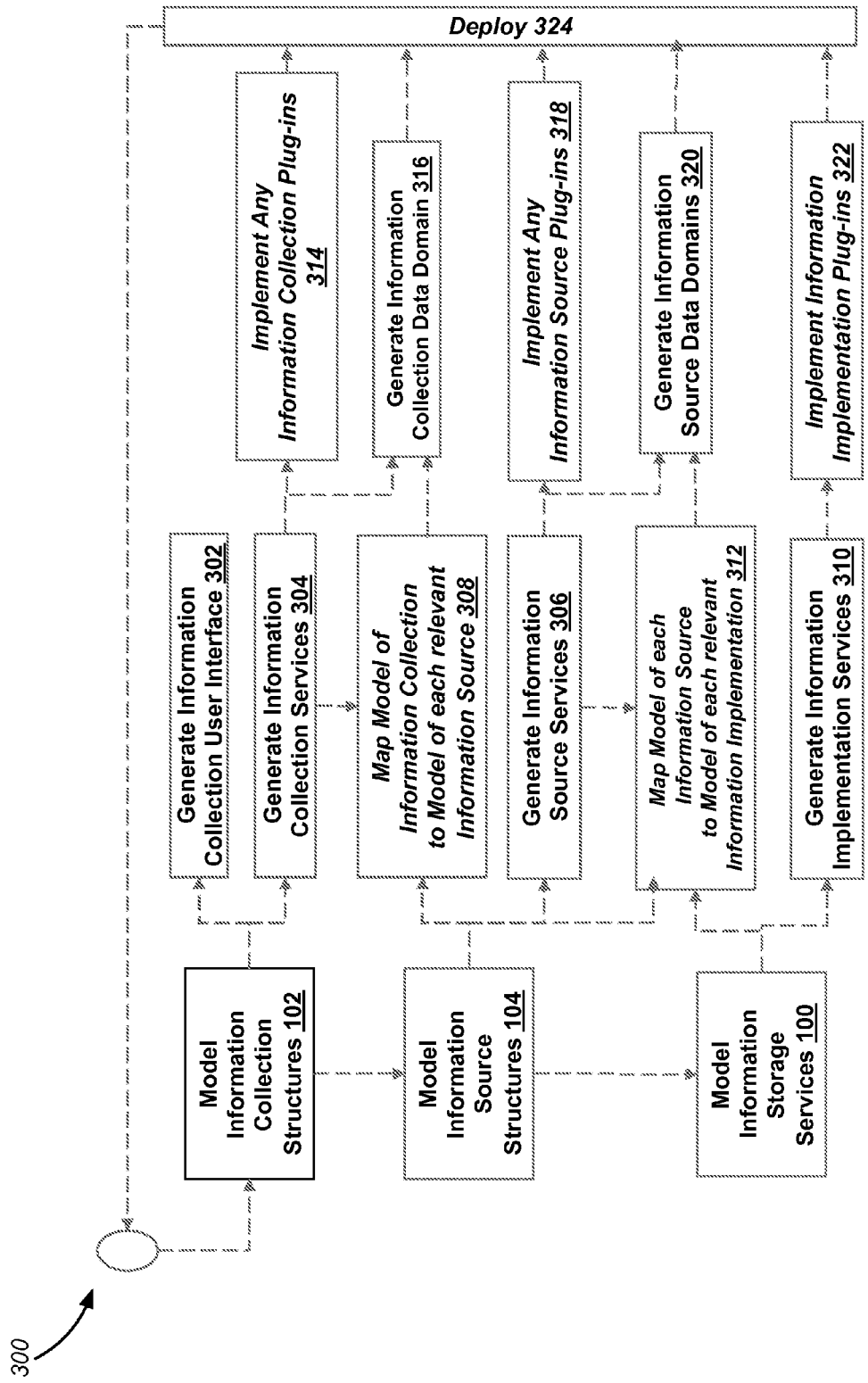
FIG. 3 shows a flowchart of how the models (100) shown in FIG. 1 seed the generation of the components for the framework (200) shown in FIG. 2, in accordance with one implementation.

As can be seen in FIG. 3, the Model of Information Collection Structures (102) is used to generate the information collection UI (202) (step 302) and to generate information collection services (204) (step 304). The Model of Information Source Structures (104) is used to generate Information Source Services (210) (step 306). A mapping of the information collection services (204) and the information source services (210) is then created (step 308). The information storage services data model (110) is used to generate information implementation services (216) (step 310). A mapping of the information source services (210) and the information implementation services (216) is then created (step 312). Next, information collection plug-ins (220, 222) are implemented (step 314). An information collection data domain (206, 208) is generated (step 316) based on the information collection services (204) and the mapping (308) to the information sources (306). Information source plug-ins (232) are generated (step 318) from the information source services (306). Information source data domains (214) are generated (step 320) from the information source services (210) and the mapping to information implementations (312). Information implementation plug-ins (224, 226) are implemented (step 322), based on the information implementation services (216). Finally, the framework (200) is deployed (step 324).

Figure 2:
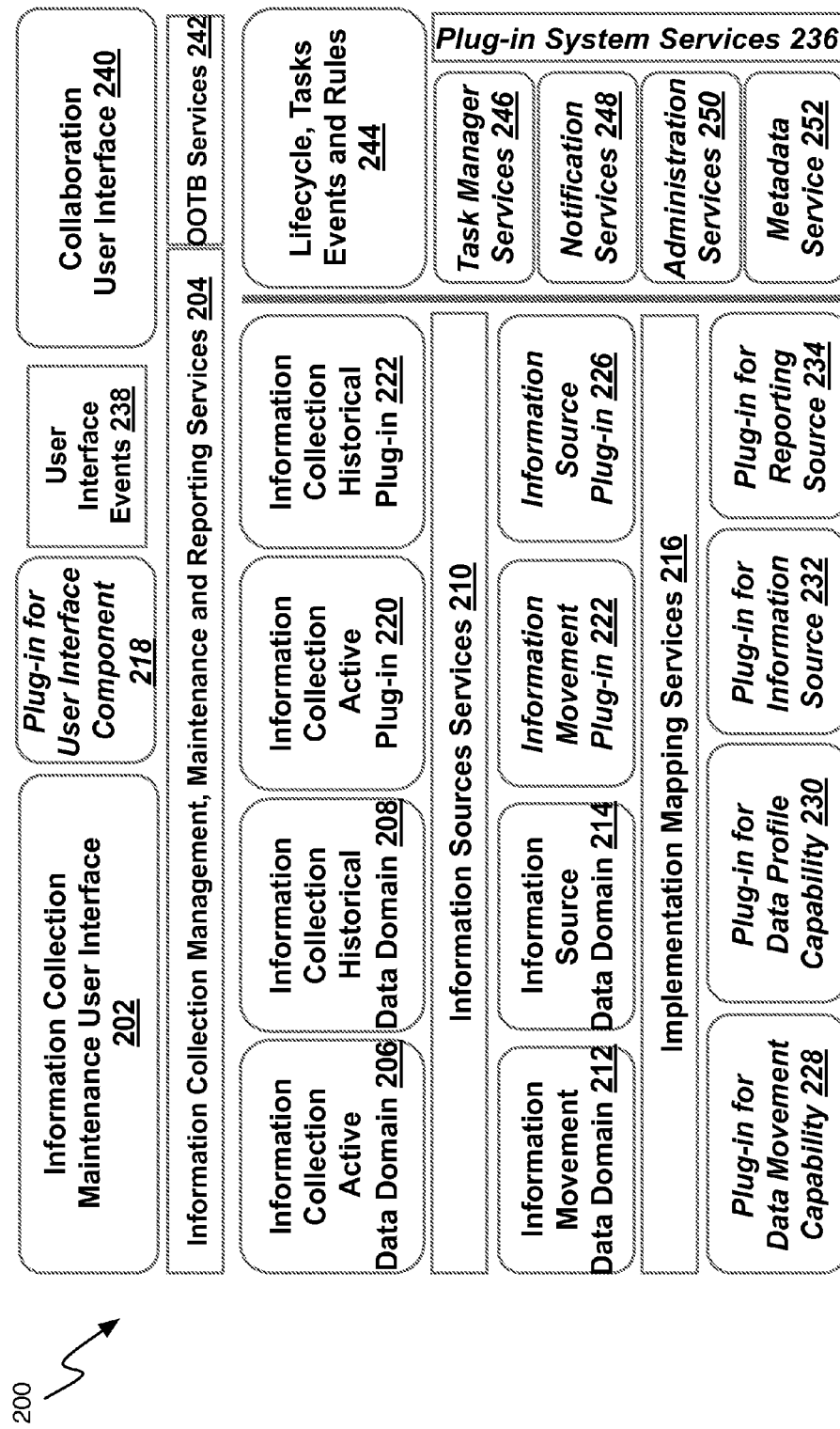
FIG. 2 shows a block diagram of a Data Stewardship Framework (200) in accordance with one embodiment.

In the framework (200) illustrated in FIGS. 2 and 3, the UI technology is a UI component aggregation framework which supports a well-defined model for event passing between the UI components. Having such a capability enables customized UI components to be plugged into the framework (200) and to interact seamlessly on the same screen with the OOTB UI components and generated information collection UI components. One embodiment uses IBM® InfoSphere™ MashupHub, which supports the iWidget standard (i.e, a specification for implementing browser based user interface components) used in all of the SWG brands—such as IBM's Business Space powered by WebSphere®, IBM® Mashup Center, Tivoli® Integrated Portal, etc. (IBM, InfoSphere, WebSphere and Tivoli are trademarks of International Business Machines Corporation registered in many jurisdictions worldwide.) The Framework (200) implements the data stewardship UI Events and Collaboration UI Components.

The ability to model and generate the three levels of models (102, 104, 110), comes from the Master Information Hub (MIH) Workbench from InfoSphere. MIH is a data server, which enables the design of complex data domains (such as the ones described herein), and then creates a set of runtime services to act on those data domains. The Framework (200) provides patterns to guide the development process.

An Information Collection is modeled as a MIH Target-specific View and Data Domain. A Data Domain is a set of related objects (such as customer, insurance policy and so on). A target specific view is one that is specific to the consuming application (for example, a policy review application may not need visibility into all of the customer information). The Information Collection UI is generated from the appropriate service group in the Target-Specific View.

The Information Source Data Domain is modeled as an MIH Data Domain. It can optionally have a Target Specific View if the services need to be called outside of the framework (200). The implementations are modeled as an outbound service group in one of more Target-specific Views.

The interfaces to the Data Domains and Target-Specific Views all have a parameter structure and a return value structure. The mappings between these structures can be implemented using the following methods:

Simple filter (removes fields)

Intelligent Filter (removes fields using plugged in Java logic) (Java and all Java-based trademarks and logos are trademarks or registered trademarks of Oracle and/or its affiliates.)

Simple Mapping between fields (no data conversion)

Complex Mapping (used Java to perform a data transformation)

The runtime for the framework (200) can be the MIH Common Platform. Other software products can provide pre-built plug-ins to the framework (200) to reduce the implementation cost. For example:

IBM® InfoSphere™ Information Analyzer (an IBM product that scans and analyzes databases to provide a profile of the data in those databases, as making it easier to understand the data) can provide a Data Profiling Plug-in.

IBM® DataStage® (an IBM product that serves data) can provide a Data Movement Plug-in. (DataStage is also a trademark of International Business Machines Corporation, registered in many jurisdictions worldwide.)

A packaged application can provide an information source, or Information Collection or UI component To summarize, the framework allows a separation of the Data Stewardship view of data, which is of a homogenous collection of related information, from how the data is actually managed in the information technology systems, which is often a very fragmented, duplicated or inconsistent implementation. The framework does this by recognizing the need for three levels of consideration, which is represented by the three-level model: a first level for Information collection, a second level for information source and a third level for information implementation. In contrast, conventional systems typically have stewardship acting directly on the IT implementation layer. Such a system is simple to support but only shows a partial view of the information, and therefore it can be hard to demonstrate how a particular change to the information collection impacts the business because it is a partial picture. Stewardship functions also typically have to be re-implemented for each system, which results in a need for extra coordination when changes need to be made to the information collection.

In contrast, the various implementations of the framework described herein support the mediation and translation between the three views. For example: The framework supports an integrated view of information for the steward to work on when information is managed in a heterogeneous environment. This view is presented by the information collection layer of components. The information source layer shows a sanitized view of the information from each system and the information implementation layer is responsible for the calls to the real implementation to extract and update the data. A change made to an entity in the information collection may need to be pushed to multiple implementations because information is often duplicated.

Various embodiments of the framework can include one or more of the following advantages. The framework is a highly customizable, multi-user framework, so the framework can be set up to support the Data Stewards within an organization in a consistent, coherent manner, irrespective of the storage technologies used to hold the information. It is possible to enforce policies and to apply changes consistently across an information collection, to drive approval cycles as changes are made to the data, and to insert missing values as if the information in the collection were co-located. The framework can be used to manage essentially any type of data, such as metadata, reference data, classification data, operational and analytical (e.g., Data Warehouse) data. The framework can also be used to provide support for temporary collections of data, for example, an extract of data in a staging table for an application migration or consolidation project. The framework can provide a single place to measure and monitor the overall state of the governed information, and can also integrate with existing business process and notification systems to provide a consistent way of processing all business related tasks. The framework can be used to demonstrate consistent management of an information collection across an organization.

Figure 4:
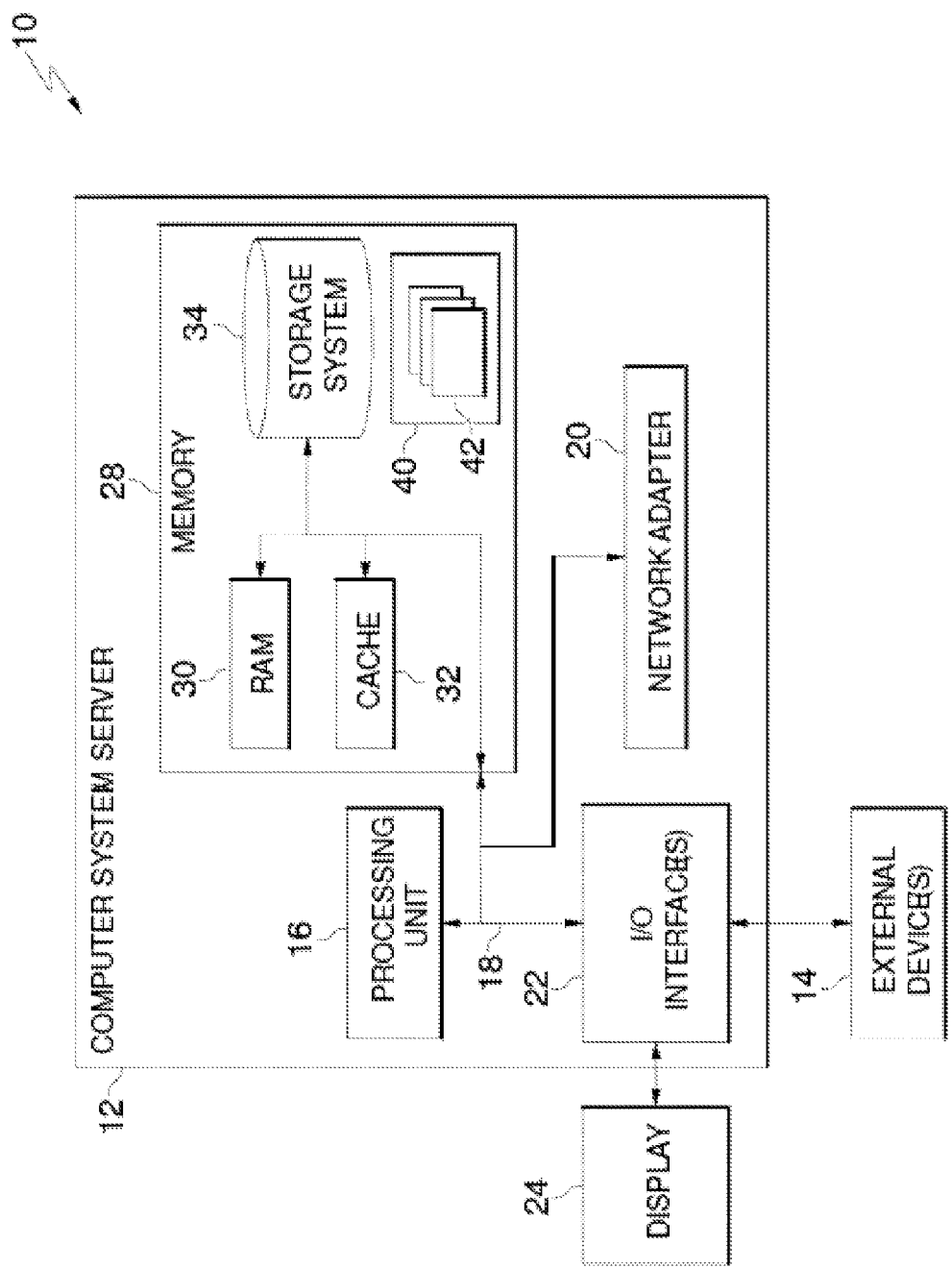
FIG. 4 shows an exemplary computer system (10) in which the Data Stewardship Framework in accordance with one embodiment can be implemented.

FIG. 4 shows a schematic of an example of a computer system (10) in which various embodiments of the invention described herein can be realized. It should be noted that the computer system (10) is only one example of a suitable computer system (10) and is not intended to suggest any limitation as to the scope of use or functionality of embodiments of the invention described herein. In the computer system (10) there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed and heterogeneous environments where tasks are performed by remote processing devices that are linked through a communications network. In a distributed computing environment, program modules may be located in both local and remote computer system storage media including memory storage devices.

As shown in FIG. 4, the server 12 in the computing system (10) is shown in the form of a general-purpose computing device. The components of server 12 may include, but are not limited to, one or more processors or processing units 16, a system memory 28, and a bus 18 that couples various system components including system memory 28 to processor 16. Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus. The server 12 typically includes a variety of computer system readable media. Such media may be any available media that is accessible by computer server 12, and it includes both volatile and non-volatile media, removable and non-removable media.

System memory 28 can include computer system readable media in the form of volatile memory, such as random access memory (RAM) 30 and/or cache memory 32. Computer server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer server 12 may also communicate with one or more external devices 14 such as a keyboard, a pointing device, a display 24, etc.; one or more devices that enable a user to interact with computer server 12; and/or any devices (e.g., network card, modem, etc.) that enable computer system/server 12 to communicate with one or more other computing devices. Such communication can occur via Input/Output (I/O) interfaces 22. Still yet, computer server 12 can communicate with one or more networks such as a local area network (LAN), a general wide area network (WAN), and/or a public network (e.g., the Internet) via network adapter 20. As depicted, network adapter 20 communicates with the other components of computer server 12 via bus 18. It should be understood that although not shown, other hardware and/or software components could be used in conjunction with computer server 12. Examples, include, but are not limited to: microcode, device drivers, redundant processing units, external disk drive arrays, RAID systems, tape drives, external information storage sources, and various types of data archival storage systems, etc.

The various implementations of the framework allow for the breadth of information being managed to be gradually extended over time by adding new information sources and information implementations. The information collection (and hence the work of the steward) is not effected. This makes the solution scalable. When a business policy changes resulting in a change needing to be made to the information, it can be applied at the information collection level and then pushed down to the real implementations. The three layers enables the creation of a multi layer audit trail that explains how the information collections are changing and how that was pushed down to the real systems below. This helps to demonstrate compliance to particular regulations where consistency and completeness of information reported on must be demonstrated—such as BASEL II for banking.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention claimed is:

1. A computer implemented method for generating a data stewardship framework for an information collection for an organization, comprising:
generating, by a processor, a data stewardship software framework having a three-level information model, the three-level information model being operable to be coupled between a high-level language environment and a heterogeneous system of information storage sources to create a homogeneous view of an information collection being managed in the heterogeneous system of information storage sources, the three-level information model comprising:
a first level having an information collection model specifying what information is to be collected by the data stewardship framework and be stored as an information collection in one or more information storage sources;
a second level having an information source model referencing data sets containing the information specified by the information collection model;
a third level having an information storage services model specifying information storage services operable to perform operations on the one or more information storage sources;
a first mapping between the information collection model and the information source model; and
a second mapping between the information source model and the information storage services model,
wherein the three-level information model is configured to allow a user of the data framework to view and perform operations on the information collection in the high-stewardship level language environment by referencing the information collection model only and without having any knowledge about how the information collection is stored in the information storage sources.

2. The method of claim 1, further comprising:
generating, by the processor, information collection services, based on the information collection model;
generating by the processor, information source services, based on the information source model; and
generating by the processor, information implementation services based on the information storage services model.

3. The method of claim 2, wherein the first mapping includes a mapping of the information collection services to the information source services.

4. The method of claim 2, wherein the second mapping includes a mapping of the information source services to the information implementation services.

5. The method of claim 1, further comprising:
generating, by the processor, an information collection user interface.

6. The method of claim 2, further comprising:
generating, by the processor, an information collection data domain based on the information collection services and the first mapping.

7. The method of claim 2, further comprising:
generating, by the processor, information source data domains based on the information source services and the second mapping.

8. A computer-implemented data stewardship software framework for an information collection for an organization, comprising:
a processor; and
a memory storing instructions that when executed by the processor implement a three-level information model, the three-level information model being operable to be coupled between a high-level language environment and a heterogeneous system of information storage sources to create a homogeneous view of an information collection being managed in the heterogeneous system of information storage sources, the three-level information model comprising:
a first level having an information collection model, residing in a memory of a computer system, the information collection model specifying what information is to be collected by the data stewardship framework and be stored as an information collection in one or more information storage sources;
a second level having an information source model, residing in the memory of the computer system, the information source model referencing data sets containing the information specified by the information collection model;
a first mapping between the information collection model and the information source model, the first mapping residing in the memory of the computer system;
a third level having an information storage services model, residing in the memory of the computer system, the information storage services model specifying information storage services operable to perform operations on the one or more information storage sources; and
a second mapping between the information source model and the information storage services model, the second mapping residing in the memory of the computer system,
wherein the three-level information model is configured to allow a user of the data stewardship framework to view and perform operations on the information collection in the high-level language environment by referencing the information collection model only and without having any knowledge about how the information collection is stored in the information storage sources.

9. The framework of claim 8, further comprising:
one or more information collection services generated based on the information collection model;
one or more information source services generated based on the information source model; and
one or more information implementation services generated based on the information storage services model.

10. The framework of claim 9, wherein the first mapping includes a mapping of the information collection services to the information source services.

11. The framework of claim 9, wherein the second mapping includes a mapping of the information source services to the information implementation services.

12. The framework of claim 8, further comprising:
an information collection user interface.

13. The framework of claim 9, further comprising:
an information collection data domain generated based on the information collection services and the first mapping.

14. The framework of claim 9, further comprising:
one or more information source data domains generated based on the information source services and the second mapping.

15. A computer program product for generating a data stewardship framework for an information collection for an organization, the computer program product comprising:
a non-transitory computer usable storage medium having computer usable program code embodied therewith, the computer usable program code comprising:
computer usable program code configured to generate a data stewardship software framework having a three-level information model, the three-level information model being operable to be coupled between a high-level language environment and a heterogeneous system of information storage sources to create a homogeneous view of an information collection being managed in the heterogeneous system of information storage sources, the three-level information model comprising:
a first level having an information collection model specifying what information is to be collected by the data stewardship framework and be stored as an information collection in one or more information storage sources;
a second level having an information source model referencing data sets containing the information specified by the information collection model;
a third level having an information storage services model specifying information storage services operable to perform operations on the one or more information storage sources;
a first mapping between the information collection model and the information source model; and
a second mapping between the information source model and the information storage services model,
wherein the three-level information model is configured to allow a user of the data stewardship framework to view and perform operations on the information collection in the high-level language environment by referencing the information collection model only and without having any knowledge about how the information collection is stored in the information storage sources.

16. The computer program product of claim 15, further comprising:
computer usable program code configured to generate information collection services, based on the information collection model;
computer usable program code configured to generate information source services, based on the information source model; and
computer usable program code configured to generate information implementation services based on the information storage services model.

17. The computer program product of claim 16, wherein the first mapping includes a mapping of the information collection services to the information source services.

18. The computer program product of claim 16, wherein the second mapping includes a mapping of the information source services to the information implementation services.

19. The computer program product of claim 16, further comprising:

computer usable program code configured to generate an information collection data domain based on the information collection services and the first mapping.

20. The computer program product of claim 16, further comprising:

computer usable program code configured to generate information source data domains based on the information source services and the second mapping.

* * * * *